(12) United States Patent  
Wentzloff et al.

(10) Patent No.: US 9,419,838 B1
(45) Date of Patent: Aug. 16, 2016

(54) LOW POWER WIRELESS COMMUNICATION UTILIZING OFDM BACKCHANNELS

(71) Applicant: The Regents of The University of Michigan, Ann Arbor, MI (US)

(72) Inventors: David D. Wentzloff, Ann Arbor, MI (US); Hun Seok Kim, Ann Arbor, MI (US)

(73) Assignee: The Regents Of The University Of Michigan, Ann Arbor, MI (US)

( * ) Notice: Subject to any disclaimer, the term of this patent is extended or adjusted under 35 U.S.C. 154(b) by 0 days.

(21) Appl. No.: 14/826,799

(22) Filed: Aug. 14, 2015

(51) Int. Cl.
*H04L 27/26* (2006.01)

(52) U.S. Cl.
CPC ........ *H04L 27/2637* (2013.01); *H04L 27/2621* (2013.01); *H04L 27/2628* (2013.01)

(58) Field of Classification Search
CPC ............ H04L 27/2637; H04L 27/2621; H04L 27/2628
See application file for complete search history.

(56) References Cited

U.S. PATENT DOCUMENTS

| | | |
|---|---|---|
| 2009/0245340 A1 | 10/2009 | Sorbara et al. |
| 2010/0296428 A1 | 11/2010 | Ho |
| 2010/0303160 A1* | 12/2010 | Rezvani ............... H04L 27/265 375/260 |
| 2011/0164698 A1* | 7/2011 | Wu ....................... H04L 5/0037 375/261 |
| 2013/0286959 A1* | 10/2013 | Lou ...................... H04W 72/04 370/329 |
| 2014/0161169 A1 | 6/2014 | Primerano et al. |
| 2014/0269563 A1 | 9/2014 | Wentzloff et al. |
| 2015/0131756 A1* | 5/2015 | Suh ..................... H04L 27/2628 375/295 |
| 2015/0312077 A1* | 10/2015 | Porat ....................... H04L 5/00 370/329 |
| 2015/0382274 A1* | 12/2015 | Logvinov ............ H04L 41/0833 370/311 |

FOREIGN PATENT DOCUMENTS

| | | |
|---|---|---|
| EP | 1338094 A1 | 8/2003 |
| WO | WO-2006010027 A2 | 1/2006 |

\* cited by examiner

*Primary Examiner* — Freshteh N Aghdam
(74) *Attorney, Agent, or Firm* — Harness, Dickey & Pierce, PLC

(57) ABSTRACT

An innovative software-defined backchannel communication scheme is provided for use in ultra-low power devices. The technique enables interconnecting heterogeneous devices through a WiFi backchannel that can be realized with existing infrastructure without any hardware modifications. The backchannel communication scheme can also be extended to other OFDM based communication systems, such as cellular 4G LTE.

19 Claims, 12 Drawing Sheets

LOW POWER WIRELESS COMMUNICATION UTILIZING OFDM BACKCHANNELS

FIELD

The present disclosure relates to low power wireless communication using back-channels.

BACKGROUND

An innovative, software-defined OFDM (orthogonal frequency division multiplexing) back-channel communication for ultra-low power (ULP) Internet-of-things (IoT) devices is disclosed. This technique enables interconnecting heterogeneous ULP IoT devices through an OFDM based back-channel that can be realized with existing WiFi (IEEE 802.11a/g/n) infrastructure without any hardware modification. The OFDM back-channel signaling has unique properties that are easily detectable by ULP wireless receivers consuming only 100 s of uW (micro Watts) or even less. This technique eliminates the need for specialized transmitter hardware or dedicated channel resources for embedded back-channel signal transmission. Instead, carefully sequenced data bit streams generate back-channel messages embedded in standard compliant OFDM packets. This OFDM back-channel communication is feasible in various modulation formats such as pulse position modulation (PPM), pulse phase shift keying (PPSK) or frequency shift keying (FSK) that are easily decodable by heterogeneous, non-WiFi ULP IoT devices. The OFDM back-channel transmission can be enabled on existing legacy WiFi devices (e.g., smartphones, Access Points, etc.) without any hardware modification. This technique makes an ULP OFDM back-channel receiver operable with 1000× lower power consumption than a commercial low power WiFi receiver and 200× lower power than a Bluetooth/IEEE 802.15.4 Zigbee receiver. The OFDM back-channel can be utilized as a ULP paging/wakeup/interrupt channel enabled by already deployed legacy WiFi devices. This back-channel concept can be extended and generalized to other OFDM based communication systems such as the cellular 4G LTE (long-term evolution).

Demodulating an OFDM modulated WiFi signal is a very power demanding task (typically 200 mW) due to stringent RF/analog frontend specifications and sophisticated digital baseband processing. Many power critical WiFi devices consume a significant portion of its standby power just to maintain the WiFi connection constantly listening to WiFi Access Points (APs). Although WiFi signals are ubiquitously available in urban environments (e.g., Google WiFi APs in the city of Mountain View), the majority of ULP IoT devices cannot utilize WiFi connectivity because of their extremely limited power and/or complexity budget. This disclosure will break this barrier to allow heterogeneous ULP IoT devices to interoperate with already existing WiFi infrastructure with minimal power consumption.

This section provides background information related to the present disclosure which is not necessarily prior art.

SUMMARY

This section provides a general summary of the disclosure, and is not a comprehensive disclosure of its full scope or all of its features.

A method is provided for encoding a message in a signal transmitted in accordance with an orthogonal frequency-division multiplexing (OFDM). The method includes: identifying, by a transmitter, a subset of subcarrier symbols from which to create an OFDM symbol, where the subset of subcarrier symbols is selected from a finite symbol space for orthogonal frequency-division multiplexing and produces a signal that can be demodulated by a receiver that does not comply with OFDM; receiving, by the transmitter, backchannel data to be transmitted in accordance with OFDM; encoding, by the transmitter, the backchannel data using the subset of subcarrier symbols; and transmitting, by the transmitter, the encoded backchannel data across a wireless network using orthogonal frequency-division multiplexing.

Backchannel data can be encoded by assigning a sequence of subcarrier symbols with a constant (or substantially constant) phase rotation rate across subcarriers, thereby forming one or more pulses in time domain of an OFDM symbol. In one example, backchannel data is encoded by adjusting the position of pulses within the OFDM symbol by selecting a particular phase rotation rate for the sequence of subcarrier symbols.

In another example, backchannel data is encoded by adjusting the phase of pulses in the OFDM symbol by selecting one of two or more starting subcarrier symbols having different phases.

In yet another example, backchannel data is encoded by adjusting the amplitude of pulses in the OFDM symbol by selecting one of two or more starting subcarrier symbols having different amplitudes. Alternatively, the backchannel data can be encoded by adjusting pulse frequency in the OFDM symbol by using one or more phase rotation values for subcarrier symbol allocation.

In one aspect, encoding the backchannel data further comprises: generating a desired sequence of subcarrier symbols which corresponds to the backchannel data, where the subcarrier symbols for the desired sequence of subcarrier symbols are selected from the subset of subcarrier symbols; converting the desired sequence of subcarrier symbols to an intermediate bit sequence using inverse operations of subcarrier mapping, interleaving, and puncturing; and assigning values to an input bit sequence which results in the intermediate bit sequence after undergoing scrambling and convolutional encoding.

In a different variant, the backchannel data can be encoded by assigning subcarrier symbols with varying amplitude across subcarriers, thereby modulating the frequency at which the energy of an OFDM symbol is concentrated. Similarly, the backchannel data can be encoded by assigning subcarrier symbol with varying amplitude across subcarriers as well as consecutive OFDM symbols, thereby modulation frequency chirp over consecutive OFDM symbols.

In this variant, encoding the backchannel data further comprises: generating a desired sequence of subcarrier symbols which corresponds to the backchannel data, where the subcarrier symbols for the desired sequence of subcarrier symbols are selected from the subset of subcarrier symbols; for each subcarrier, determining select subcarrier symbols from the subset of subcarrier symbols that can be assigned to a given subcarrier; for each subcarrier, evaluating a cost function with a transmitter input bit value of zero and a transmitter input bit value of one, where the cost function is evaluated in part based on the select subcarrier symbols that can be assigned to the given subcarrier; and assigning values to an transmitter input bit sequence based on the evaluation of the cost function.

On receive side, the encoded backchannel data is received by and decoded by a receiver, where the receiver does not comply with OFDM.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
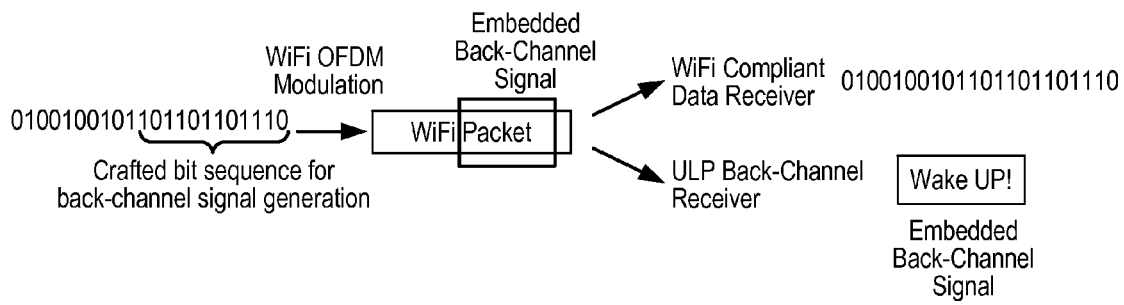
FIG. 1 is a diagram depicting Wi-Fi back-channel communication.

Embedded back-channel signals can be generated by a set of crafted bit sequences within the boundary of a standard WiFi packet structure (IEEE 802.11a/g/n). The concept is depicted in FIG. 1. Systematic methods are disclosed to generate a subset of unique bit sequences that will embed desired back-channel signals in WiFi packets. These methods comply with strict constraints of the WiFi packet structure and its OFDM modulation parameters.

In OFDM, the information bits are modulated using a linear modulation schemes, such as quadrature amplitude modulation (QAM), on each subcarrier with equal average power, resulting in a power spectral density (PSD) in the frequency spectrum that is flat (i.e., white spectrum) over the channel bandwidth. This 'white' PSD property makes the OFDM time domain signal appear as a white noise-like signal with relatively high peak-to-average power ratio (PAPR). In fact, the high PAPR is one of the major drawbacks of OFDM based systems since it requires highly linear RF circuits over a wide dynamic range. This disclosure turns this property into a controlled modulation scheme by feeding carefully crafted bit sequences and generating 'intentional' pulses at specific positions (i.e., pulse position modulation or PPM)

Figure 2:
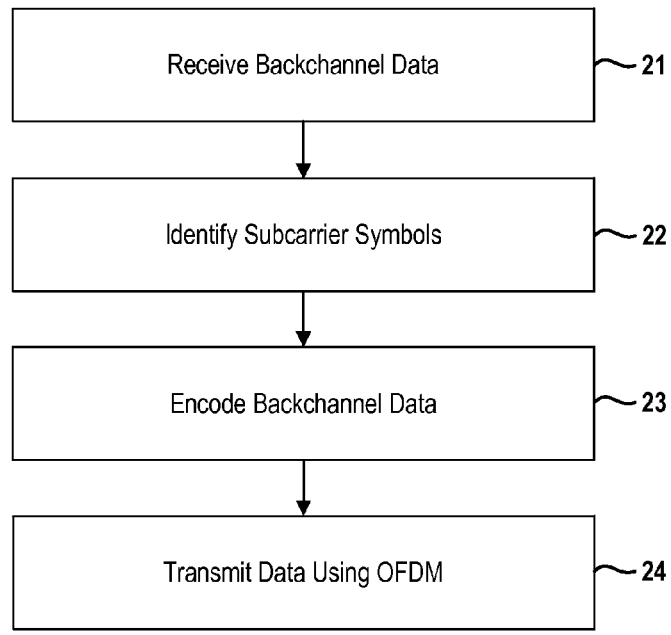
FIG. 2 is a flowchart depicting an example method for encoding a signal transmitted in accordance with OFDM.

An example method for encoding a message in a signal transmitted in accordance with OFDM is described in relation to FIG. 2. First, backchannel data which is to be transmitted is received by a transmitter as indicated at 21. A subset of subcarrier symbols (e.g., QAM symbols) from which to create an OFDM symbol that conveys the backchannel data is identified at 22, where the subset of subcarrier symbols is selected from a finite symbol space for orthogonal frequency-division multiplexing. It is noted that the subset of subcarrier symbols produce a signal that can be transmitted by a transmitter in accordance with OFDM but can be demodulated by a receiver that does not comply with OFDM.

The backchannel data is in turn encoded at 23 using subcarrier symbols selected from the subset of OFDM symbols. Different techniques for encoding the data are further described below. The encoded backchannel data is then transmitted at 24 by the transmitter across a wireless network using orthogonal frequency-division multiplexing. While reference is made through this disclosure to QAM symbols, it is readily understood that the teachings of this disclosure extend to other types of linear modulation schemes.

Figure 3A:
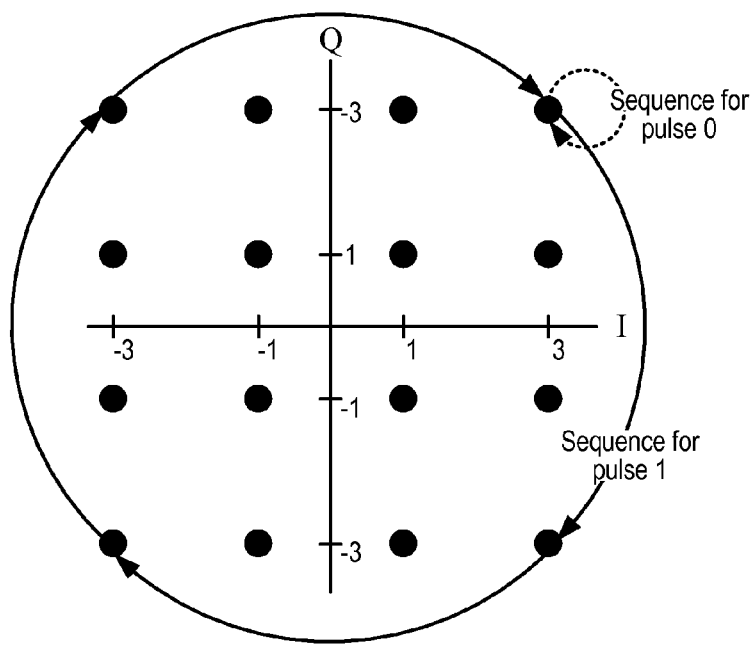
FIGS. 3A and 3B are diagrams depicting a binary pulse position back-channel modulation scheme.
Figure 3B:
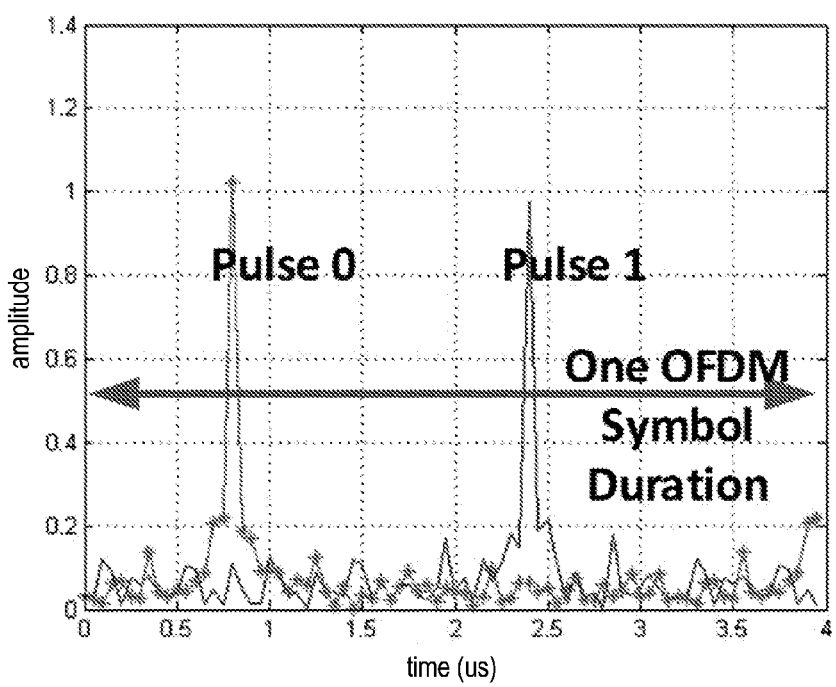

With reference to FIGS. 3A and 3B, a first technique is described for generating a certain signal in the time-domain that is easily demodulated by a receiver. More specifically, the certain signal can be produced by instructing a WiFi transmitter to send a specific sequence of data bits.

The OFDM time domain signal peak-to-average power ratio (PAPR) is maximized by assigning linear modulation symbols for OFDM subcarriers with a constant phase rotation rate across all subcarriers as in (1) below.

$$X_k = X_{k-1} e^{j\phi}, \; Q_k = q(X_k), \; k=1,2 \ldots ,K \quad (1)$$

In (1), $\phi$ is the constant phase rotation rate, k is the subcarrier index, K is the number of total subcarriers, $Q_k$ is the linear modulation symbol on the subcarrier k, q(X) is the mapping from a complex number X to the nearest valid linear modulation symbol, and $X_1$ is the starting symbol chosen from the set of valid linear modulation symbols. Inverse discrete/fast Fourier transform (IDFT or IFFT) operation on the set of $Q_k$, k=0, 1, 2, . . . results in a time domain OFDM symbol containing a pulse.

By selecting a specific $\phi$ in equation (1), one can adjust the position of a pulse within an OFDM symbol in time domain. In one embodiment, a binary pulse position modulation (PPM) embedded in an OFDM symbol is realized by using two pulse positions; pulse 0 or pulse 1, and by selecting one of two pulses depending on the message to be conveyed in back-channel modulation. For example, two distinct pulse positions; pulse 0 and pulse 1 can be generated by using $\phi=0$ for pulse 0, and $\phi=-\pi/2$ for pulse 1 while assigning a common starting symbol $X_1=3+3j$ for both pulse positions. In this example, pulse 0 falls in the first half of the symbol duration and the pulse 1 falls in second half of the symbol duration. For the linear modulation on each subcarrier, 16-QAM is assumed as an example as shown in FIG. 3A. It is understood that this method applies to bigger or smaller constellation diagrams as well.

A linear modulation symbol assignment example for the pulse 0 and pulse 1 is given in Table 1, which results in two distinct pulse positions as shown in FIG. 3B.

TABLE 1

| | Binary Pulse Position Back-Channel Modulation Example | | | | | | | | | |
|---|---|---|---|---|---|---|---|---|---|---|
| Subcarrier Index | 1 | 2 | 3 | 4 | 5 | 6 | 7 | 8 | 9 | ... |
| Subcarrier symbols to create pulse 0 | 3 + 3j | 3 + 3j | 3 + 3j | 3 + 3j | 3 + 3j | 3 + 3j | 3 + 3j | 3 + 3j | 3 + 3j | ... |
| Subcarrier symbols to create pulse 1 | 3 + 3j | 3 − 3j | −3 − 3j | −3 + 3j | 3 + 3j | 3 − 3j | −3 − 3j | −3 + 3j | 3 + 3j | ... |

In the binary PPM format, the back-channel symbol bit=0 can be transmitted by the pulse 0 while the symbol bit=1 is represented by the pulse 1. The back-channel PPM pulse rate will be the same as the OFDM symbol rate. That is, 250 k pulses per second for 20 MHz bandwidth IEEE 802.11a WiFi operation. The primary advantage of this scheme is that a low power, non-coherent receiver can easily detect and demodulate these PPM modulated symbols, thus it allows communication between a WiFi transmitter and an non-WiFi low power receiver on an energy-constrained IoT device.

Figure 4A:
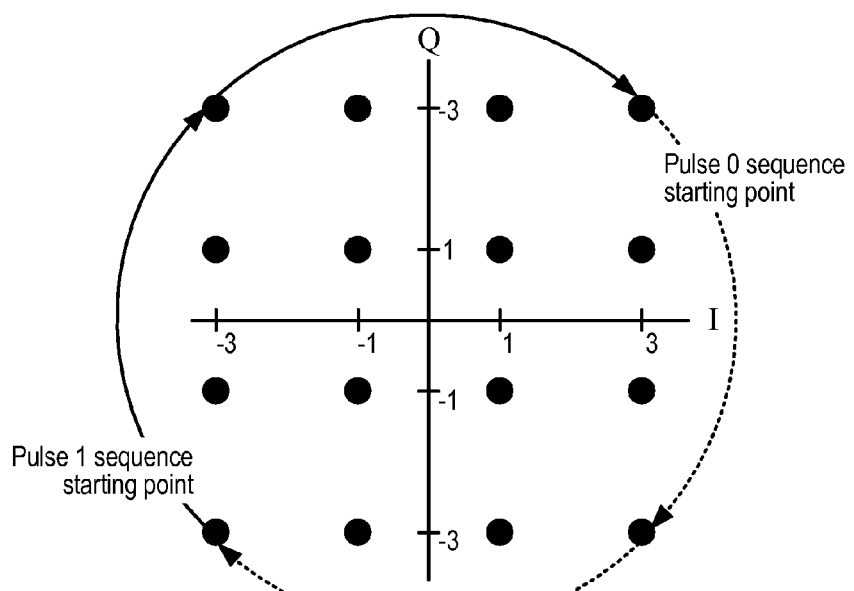
FIGS. 4A and 4B are diagrams depicting a binary pulse phase shift keying back-channel modulation scheme.
Figure 4B:
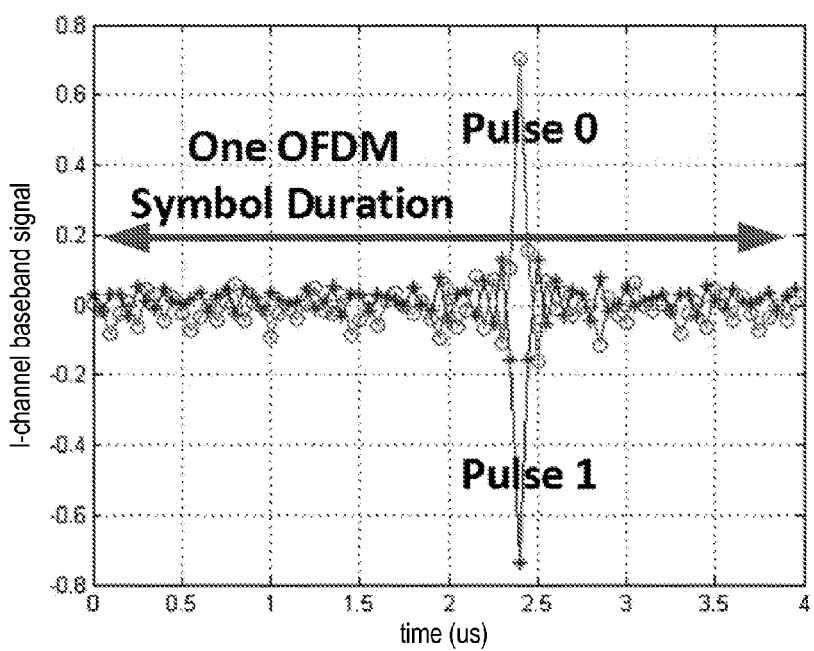

Pulse phase shift keying (PPSK) is another technique for encoding data by assigning a sequence of subcarrier symbols with a constant phase rotation. By selecting a specific starting symbol $X_1$ in equation (1), one can adjust the phase of a pulse in an OFDM symbol in time domain. With reference to FIG. 4A, a binary pulse phase shift keying back-channel symbol is realized by using two pulses; pulse 0 or pulse 1 that have the same pulse position (i.e., a common $\phi$) but different starting symbols with opposite polarities (e.g., $X_1$=3+3j for pulse 0 and $X_1$=−3−3j for pulse 1) depending on the message to be conveyed in back-channel modulation. For example, pulse 0 and pulse 1 with 180 degree phase difference (i.e., opposite polarity) can be generated by using $X_1$=3+3j for pulse 0 and $X_1$=−3−3j for pulse 1 while assigning a common phase rotation rate $\phi$=−$\pi$/2 (i.e., identical pulse positions) for both pulses. A 16-QAM based linear modulation symbol assignment example for a binary PPSK is given in Table 2, which results in 180 degree pulse phase difference (or opposite signal polarities in baseband) as shown in FIG. 4B.

TABLE 2

| | Binary Pulse Phase Shift Keying Back-Channel Modulation Example | | | | | | | | | |
|---|---|---|---|---|---|---|---|---|---|---|
| Subcarrier Index | 1 | 2 | 3 | 4 | 5 | 6 | 7 | 8 | 9 | ... |
| Subcarrier symbols to create pulse 0 | 3 + 3j | 3 − 3j | −3 − 3j | −3 + 3j | 3 + 3j | 3 − 3j | −3 − 3j | −3 + 3j | 3 + 3j | ... |
| Subcarrier symbols to create pulse 1 | −3 − 3j | −3 + 3j | 3 + 3j | 3 − 3j | −3 − 3j | −3 + 3j | 3 + 3j | 3 − 3j | −3 − 3j | ... |

Figure 5A:
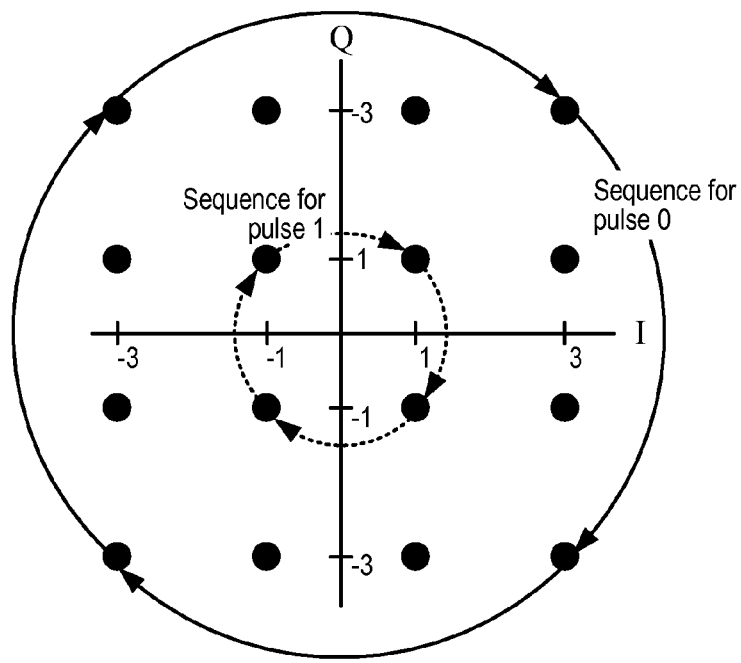
FIGS. 5A and 5B are diagrams depicting a binary pulse amplitude back-channel modulation scheme.
Figure 5B:
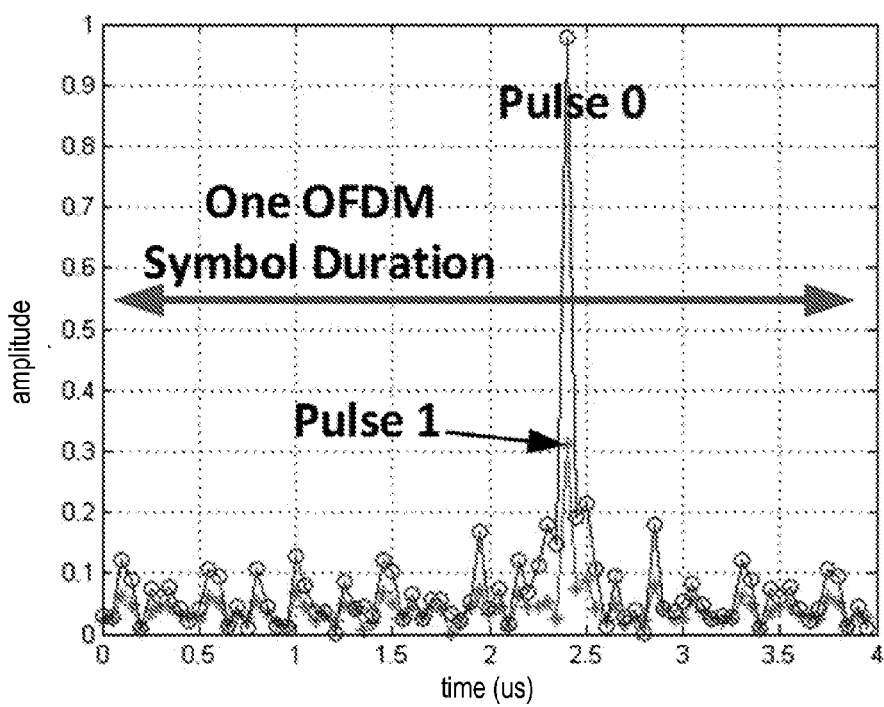

Pulse amplitude modulation (PAM) is yet another technique for encoding by assigning a sequence of subcarrier symbols with a constant phase rotation. By selecting a specific starting symbol $X_1$ in equation (1), one can adjust the amplitude of a pulse in an OFDM symbol in time domain. With reference to FIG. 5A, a binary pulse phase amplitude modulation (PAM) embedded in OFDM can be realized by using two pulses; pulse 0 or pulse 1 that have the same pulse position (La, a common $\phi$) but different starting symbols $X_1$ with distinct amplitude (e.g., $X_1$=3+3j for pulse 0 and $X_1$=1+1j for pulse 1). For example, pulse 0 and pulse 1 with distinct amplitude levels can be generated by using $X_1$=3+3j for pulse 0 and $X_1$=1+1j for pulse 1 while assigning a common phase rotation rate $\phi$=−$\pi$/2 (i.e., identical pulse positions) for both pulses. A 16-QAM based linear modulation symbol assignment example for the pulse 0 and pulse 1 is given in Table 3, which results in two distinct pulse amplitude levels as shown in FIG. 5B.

TABLE 3

| | Binary Pulse Amplitude Back-Channel Modulation Example | | | | | | | | | |
|---|---|---|---|---|---|---|---|---|---|---|
| Subcarrier Index | 1 | 2 | 3 | 4 | 5 | 6 | 7 | 8 | 9 | ... |
| Subcarrier symbols to create pulse 0 | 3 + 3j | 3 − 3j | −3 − 3j | −3 + 3j | 3 + 3j | 3 − 3j | −3 − 3j | −3 + 3j | 3 + 3j | ... |
| Subcarrier symbols to create pulse 1 | 1 + 1j | 1 − 1j | −1 − 1j | −1 + 1j | 1 + 1j | 1 − 1j | −1 − 1j | −1 + 1j | 1 + 1j | ... |

Pulse frequency modulation (PFM) is yet another technique for encoding by assigning a sequence of subcarrier symbols with more than one constant phase rotation values in (1). One can generate P pulses within an OFDM symbol by changing the phase rotation value $\phi$ in (1) among P values $\phi_1, \ldots, \phi_p$ such that $\phi=\phi_a$ for $$k = \frac{(a-1)P}{K} + 1, \ldots, \frac{aP}{K}.$$

For example, backchannel data bit 0 can be transmitted by using one pulse per OFDM symbol while the backchannel data bit 1 can be sent by increasing the pulse frequency to two pulses per OFDM symbol. A 16-QAM based linear modulation symbol assignment for this example is given in Table 4, which results in two distinct pulse frequencies for backchannel data bit 0 and 1. In this example, $\phi$=0 is used for all subcarriers to transmit backchannel data bit 0. For backchannel data bit 1, $\phi$=0 is used for subcarrier 1, 2, . . . , K/2 while $\phi$=−$\pi$/2 is used for subcarrier K/2+1, K/2+2, . . . , K.

TABLE 4

Binary Pulse Frequency Modulation Back-Channel Example

| Subcarrier Index | 1 | 2 | ... | K/2 − 1 | K/2 | K/2 + 1 | K/2 + 2 | K/2 + 3 | ... |
|---|---|---|---|---|---|---|---|---|---|
| Subcarrier symbols for pulse frequency = 1 per OFDM symbol | 3 + 3j | 3 + 3j | ... | 3 + 3j | 3 + 3j | 3 + 3j | 3 + 3j | 3 + 3j | ... |
| Subcarrier symbols for pulse frequency = 2 per OFDM symbol | 3 + 3j | 3 + 3j | ... | 3 + 3j | 3 + 3j | 3 − 3j | −3 − 3j | −3 + 3j | ... |

Figure 6:
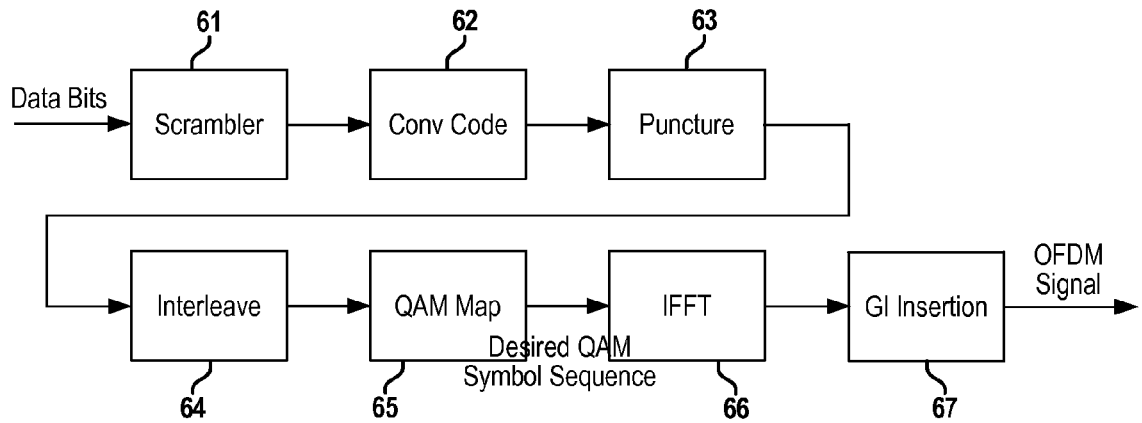
FIG. 6 is a block diagram depicting an example datapath in a WiFi compatible transmitter.

Thus far, it was assumed that an arbitrary sequence of linear modulation symbols (e.g. 16-QAM) satisfying (1) could be allocated to OFDM subcarriers to generate the desired back-channel modulated signals embedded in OFDM packets. Referring to FIG. 6, the IEEE 802.11a/g/n WiFi standard datapath, however, does not allow arbitrary sequence of linear modulation symbols to be allocated to each subcarrier. The input data bit stream is scrambled by scrambler 61 and then encoded by convolutional coder 62 with a convolutional code. The coded bit sequence is punctured by puncture 63, interleaved by interleaver 64, and finally mapped to linear modulation symbols by mapper 66 in the WiFi standards. In WiFi, M-ary QAM is used for linear modulation on each subcarrier. Some subcarriers are assigned as pilot and null subcarriers with predefined modulation symbols. Therefore, only a subset of all possible QAM symbol sequences is WiFi compliant. This disclosure circumvents this issue using the fact that the scrambler 61, interleaver 64 and QAM mapper 65 in WiFi standards are all one-to-one mapping, invertible functions. Puncturing operation can be disabled in some WiFi modes without affecting the bit sequence. In fact, it is only the convolutional encoder 62 and the deterministic null/pilot subcarrier mapping that prevent one from creating an arbitrary sequence of QAM symbols. The convolutional encoder 62 output has to be a valid codeword, which is a subset of all possible bit sequences.

Figure 7:
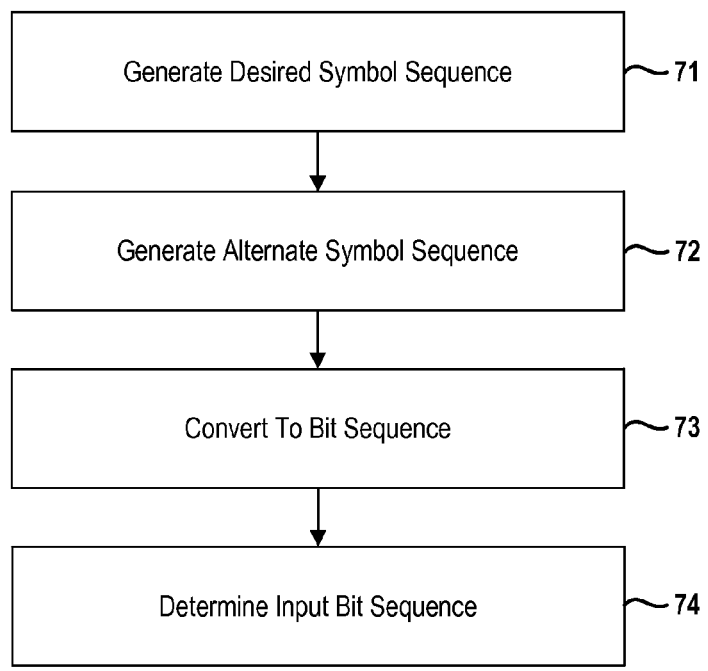
FIG. 7 is a flowchart depicting a method to identify a valid WiFi-compliant subcarrier symbol sequence which creates the desired pulse attribute in an OFDM symbol.

In order to generate pulse based back-channel symbols embedded in WiFi OFDM packets, a systematic method to create a back-channel pulse with the desired property (such as position, amplitude or phase) for each OFDM symbol is described in relation to FIG. 7. The property of a back-channel pulse within an OFDM symbol is determined by the constant (or a substantially constant) phase rotation rate, $\phi$ and the initial symbol $X_1$ in (1). Once an OFDM symbol is assigned with a specific $\phi$ and $X_1$ for pulse-based back-channel modulation, the 'desired' QAM symbol sequence for all subcarriers; $Q_1, Q_2, Q_3, \ldots, Q_K$ is obtained by (1). In general, this 'desired' QAM symbol sequence is infeasible to be realized in WiFi standard datapath because of convolutional coding and null/pilot subcarrier mapping. Accordingly, a systematic method is described below to identify a valid WiFi-compliant QAM symbol sequence that creates a back-channel pulse whose property is close to the desired back-channel pulse property, such as position, amplitude or phase.

Figure 8:
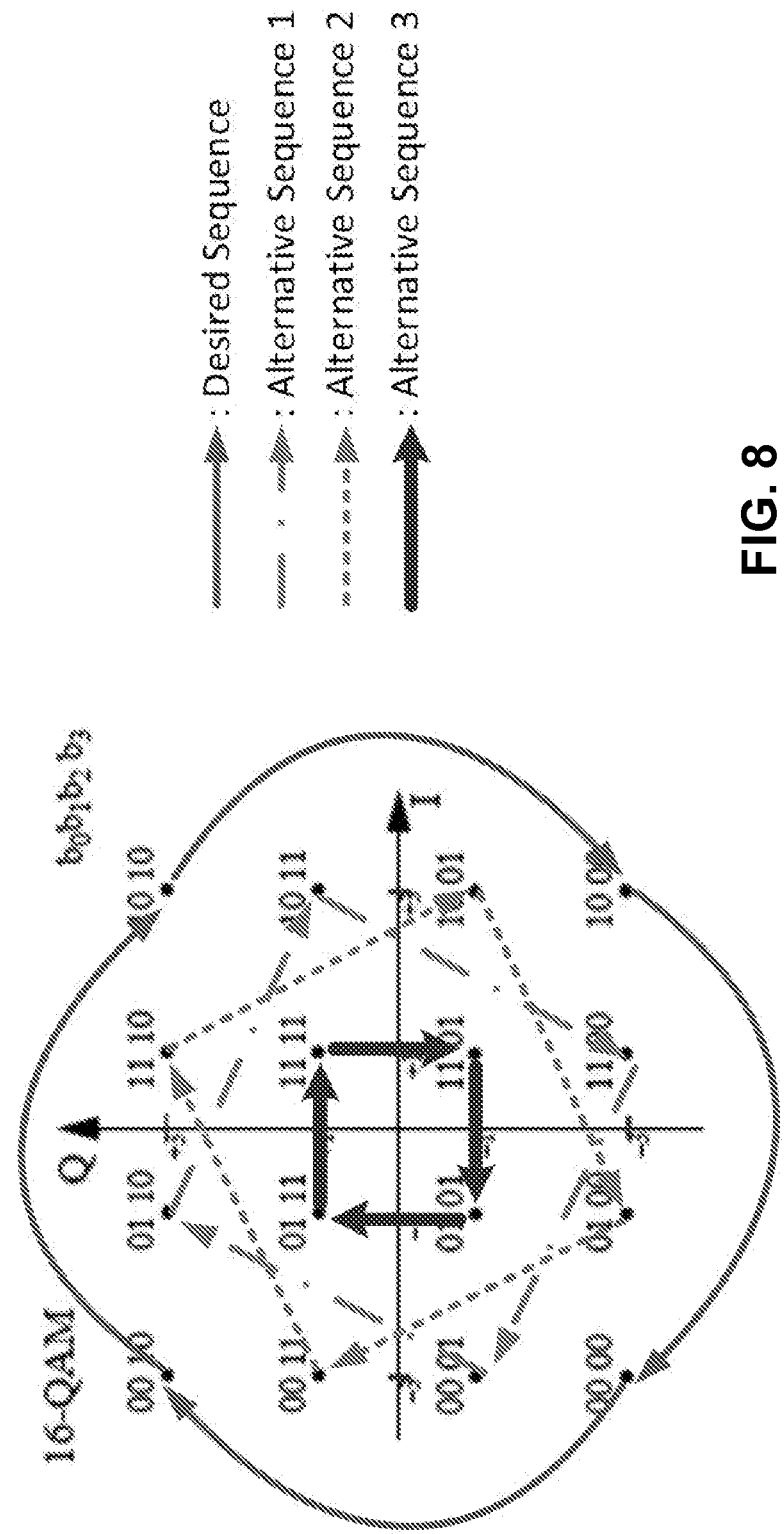
FIG. 8 illustrates a desired and alternative sequence of subcarrier symbols in an example constellation diagram.

First, a 'desired' sequence of QAM symbols is generated at 71 using a constant $\phi$ for all subcarrier indices k=0, 1, 2, ..., K. The desired sequence is not always feasible in the standard WiFi packet structure. Therefore, alternative sequences of QAM symbols are also generated at 72. For example, multiple alternative QAM sequences can be generated with the same $\phi$ but with a different starting symbol $X_1$ as seen in FIG. 8. In this example, three alternative sequences are shown with the same $\phi = -\pi/2$. It is understood that the number of alternative sequences can vary but is constrained by the constellation map.

For both desired and alternative sequences, QAM symbols that belong to pilot/null subcarriers are replaced by WiFi standard defined pilot and null symbols. Next, the desired and alternative sequences are converted at 73 to corresponding bit sequences output by the convolutional encoder. In one embodiment, the desired and alternative bit sequences are converted using inverse operations of QAM mapping, interleaving, and puncturing. These converted bit sequences are denoted as the desired coded-bit sequence and alternative coded-bit sequences.

Lastly, an input bit sequence to the scrambler is determined at 72. $N_{SI}$ bits at the scrambler input are needed to form an OFDM symbol with K subcarriers. In the example embodiment, these data bits, $b_j$ (j=0, ..., $N_{SI}$−1), are sequentially determined from the lowest index j=0. More specifically, each $b_j$ has two possible values; 0 or 1. To determine the best value, if $b_j$=0 or 1 at the scrambler input results in the 'desired' coded bit sequence after scrambling and convolutional encoding, $b_j$ is assigned with that value. For example, if $b_j$=0 results in the desired bit value of 0, then $b_j$ is assigned a value of 0. On the other hand, if $b_j$=1 results in the desired bit value of 0, then $b_j$ is assigned a value of 1. If neither $b_j$=0 nor 1 results in 'desired' coded bit sequence, $b_j$ is assigned with the value that maps to an alternative coded bit sequence. If multiple alternative coded bit sequences are feasible, the alternative sequence whose start symbol $X_1$ is closest to the start symbol $X_1$ of the desired sequence is selected for $b_j$ assignment. If all of the alternative coded bit sequences are infeasible, $b_j$ is assigned with a random value. This process is repeated for each bit in the input bit sequence until all $N_{SI}$ bits are assigned.

Figure 9A:
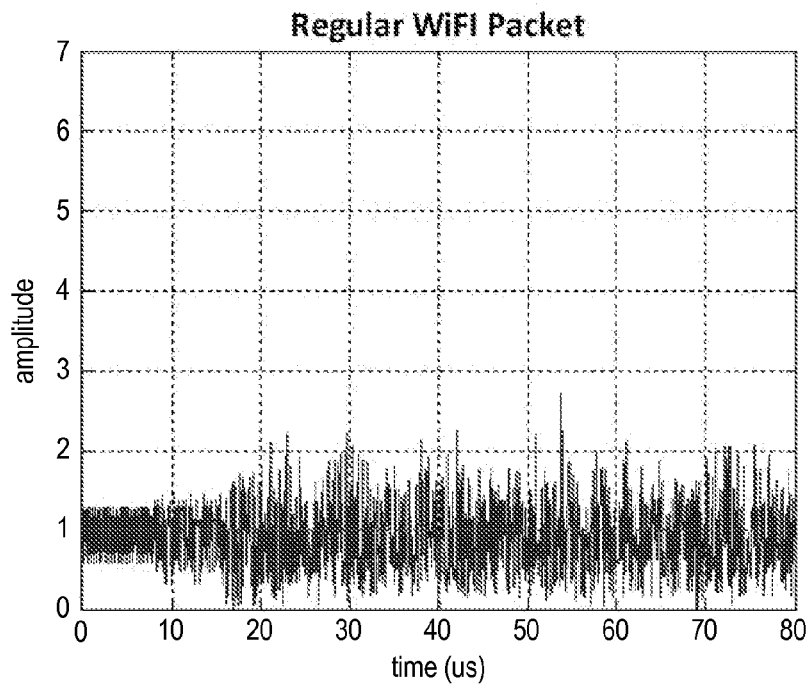
FIGS. 9A and 9B are graphs depicting simulated WiFi packets with and without, respectively, PPM back-channel modulation.
Figure 9B:
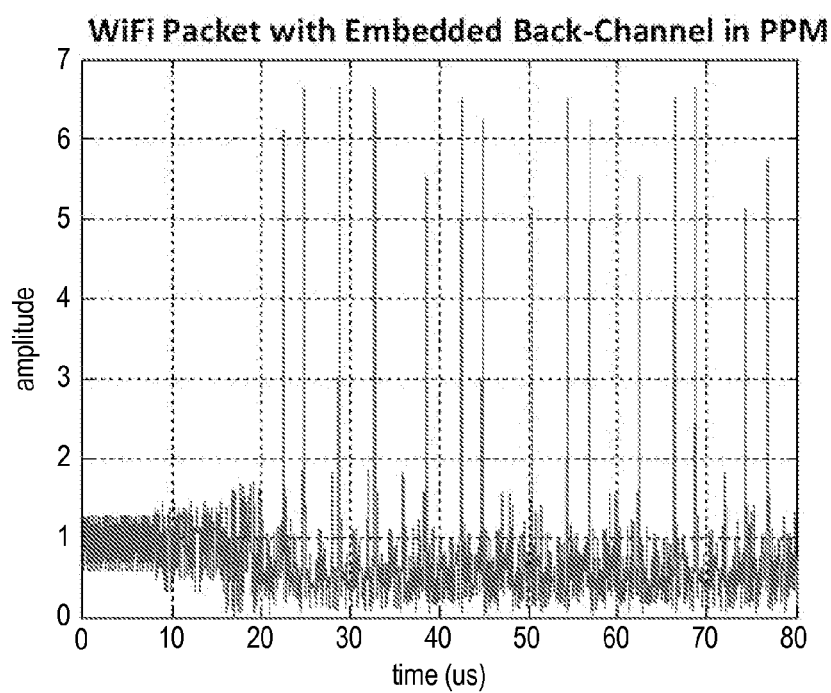

This approach was validated with MATLAB simulations and commercial WiFi transceiver chips that the data bit sequence obtained from the above procedure actually generates pulse-based back-channel signals embedded in an OFDM packet as shown in FIGS. 9A and 9B. The data rate of the binary PPM modulated back-channel is 250 k bits/s. The maximum number of back-channel modulated data bits per packet is the same as the maximum number of OFDM symbols within a packet (e.g., up to 340 bits for 16QAM modulated 802.11g WiFi).

Figure 10A:
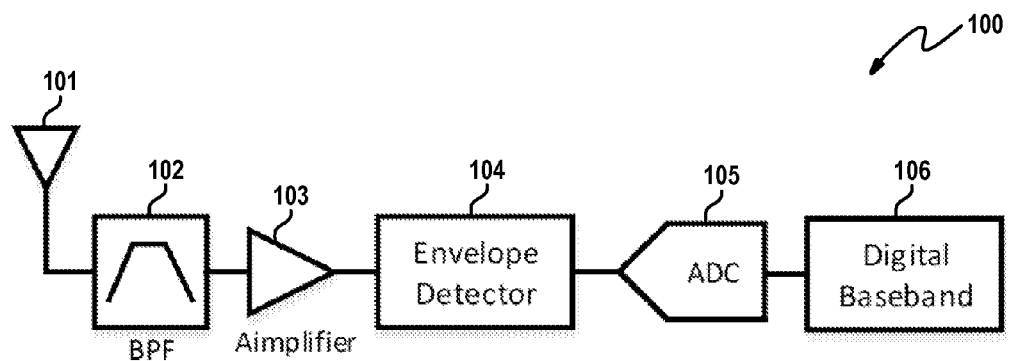
FIGS. 10A and 10B are block diagrams of example arrangements for back-channel receivers.

Given such an encoding scheme, it is feasible to realize a back-channel receiver with dramatically reduced power consumption compared to conventional OFDM receivers. Power demanding quadrature demodulation, a high accuracy clock reference, high dynamic range ADCs and DFT processing are all unnecessary for PPM back-channel demodulation. FIG. 10A depicts an example architecture for a receiver that is suitable for power-limited, non-WiFi compliant ULP devices to demodulate pulse-based back-channel signals embedded in OFDM packets. Briefly, the receiver 100 includes an antenna 101, a bandpass filter 102, an amplifier 103, an envelope detector 104, an analog-to-digital converter 105 and a digital baseband processor 106. Thus, the architecture is based on non-coherent signal envelope detection which does not require costly RF frequency synthesizers or mixers. In operation, the envelope of the signal is converted to digitally quantized levels to be processed in the digital baseband. The RF bandpass filter (BPF) 102 and the amplifier 103 can be optionally employed at the beginning of the datapath for better interference rejection and improved receiver sensitivity.

Figure 10B:
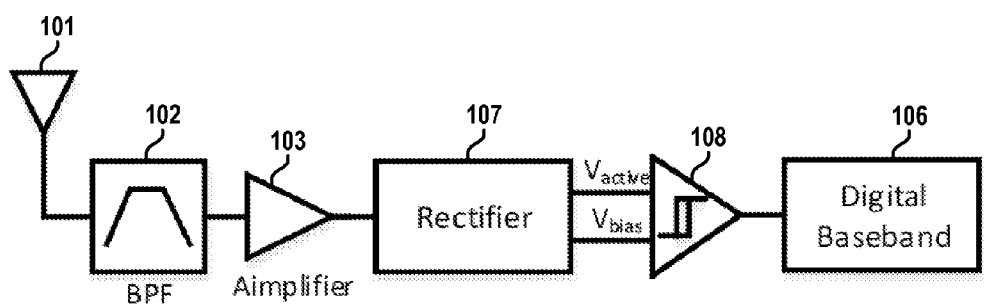

An alternative arrangement for the receiver is shown in FIG. 10B. In this arrangement, the signal envelope detector 104 and the analog-to-digital converter 105 are replaced by a rectifier 107 and a binary signal level comparator 108 for further power savings; otherwise, the remaining components are as described above in relation to FIG. 10A. Other arrangements for the back-channel receiver also fall within the broader aspects of this disclosure.

In another aspect of this disclosure, the back-channel data can be encoded onto a signal using frequency shift keying. Like producing a specific time-domain pulse signal, this section discusses producing a specific frequency domain signal that 1) can be demodulated by a receiver that does not comply with OFDM, and 2) can be produced by an OFDM transmitter by only modifying the data bit stream that the transmitter is transmitting.

In some embodiments, the OFDM back-channel can be realized in the frequency shift keying (FSK) modulation format. An intentional, non-uniform linear modulation symbol power allocation across OFDM subcarriers is proposed to generate the FSK modulated back-channel. For a binary FSK back-channel communication, the back-channel modulated bit=1 can be conveyed by allocating high power linear modulation symbols on the first half (k=1, 2, . . . , K/2) of all OFDM subcarriers and low power linear modulation symbols on the second half subcarriers (k=K/2+1, K/2+2, . . . , K). The back-channel modulated bit=0 is conveyed by the opposite mapping (i.e., low power symbols on the first half of all subcarriers, high power symbols on the second half of all subcarriers). An example linear modulation symbol assignment for the two back-channel bits is shown below in Table 5.

cating higher power to first half subcarriers (k=1, . . . K/2) for the first OFDM symbol (e.g., 0-4 us, the first back-channel message bit), and higher power to second half subcarriers (k=K/2+1, K/2+2, K) for the second OFDM symbol (e.g., 4-8 us, the second back-channel message bit). A 250 kbps binary FSK modulated back-channel can be realized in this way. The resulting FSK is much simpler to demodulate than the original OFDM.

In some embodiments, the OFDM back-channel can be realized in the frequency chirp modulation format. Binary frequency chirp modulation allocates high power subcarrier symbols with increasing or decreasing subcarrier indices over multiple OFDM symbols. An example linear modulation subcarrier symbol assignment for the two back-channel bits modulated in frequency chirp is shown below in Table 6.

TABLE 6

Frequency Chirp Modulation Example

| Subcarrier Index k | | 1, . . . , K/4 | K/4 + 1, . . . , K/2 | K/4 + 1, . . . , 3K/4 | K/4 + 1, . . . , 3K/4 |
|---|---|---|---|---|---|
| Subcarrier symbols for backchannel bit = 1 | OFDM symbol 0 | ±3 ± 3j | ±1 ± 1j | ±1 ± 1j | ±1 ± 1j |
|  | OFDM symbol 1 | ±1 ± 1j | ±3 ± 3j | ±1 ± 1j | ±1 ± 1j |
|  | OFDM symbol 2 | ±1 ± 1j | ±1 ± 1j | ±3 ± 3j | ±1 ± 1j |
|  | OFDM symbol 3 | ±1 ± 1j | ±1 ± 1j | ±1 ± 1j | ±3 ± 3j |
| Subcarrier symbols for backchannel bit = 0 | OFDM symbol 0 | ±1 ± 1j | ±1 ± 1j | ±1 ± 1j | ±3 ± 3j |
|  | OFDM symbol 1 | ±1 ± 1j | ±1 ± 1j | ±3 ± 3j | ±1 ± 1j |
|  | OFDM symbol 2 | ±1 ± 1j | ±3 ± 3j | ±1 ± 1j | ±1 ± 1j |
|  | OFDM symbol 3 | ±3 ± 3j | ±1 ± 1j | ±1 ± 1j | ±1 ± 1j |

The ideal FSK or chirp back-channel modulation on OFDM requires controlling QAM symbol power for each OFDM subcarrier as shown by the example in Table 5 or Table 6. However, arbitrary QAM symbol power application for each subcarrier is infeasible for WiFi because the datapath shown in FIG. 6 involves scrambling, convolutional encoding, puncturing and interleaving before the QAM symbol mapping. To address this issue, a systematic algorithm is provided to create approximated FSK or chirp back-channel modulation for WiFi standards.

For each OFDM symbol conveying FSK or chirp back-channel data, the high power subcarrier index set, $I_H$, and the low power subcarrier index set, $I_L$, are determined by the data bit to be transmitted via the back-channel. For example, $I_H=\{1, 2, \ldots, K/2\}$ and $I_L=\{K/2+1, K/2+2, \ldots, K\}$ if the FSK back-channel data bit=1, and $I_H=\{2K/2+1, K/2+2, K\}$ and $I_L=\{1, 2, \ldots, K/\}$ if the FSK back-channel data bit=0. Denote $Q_k$ as the set of all possible QAM symbols that can be assigned to the subcarrier k, where $Q_k^{(b)}{}_k$ initially contains all valid M-ary QAM symbols (M=64 for 64-QAM). The number of entries in $Q_k$ decreases as a result of sequentially specifying QAM mapping input bits following the back-channel modulation procedure. Each QAM mapping input bit

TABLE 5

Binary Frequency Shift keying Modulation Example

| Subcarrier Index k | 1 | 2 | . . . | K/2 | K/2 + 1 | K/2 + 2 | . . . | K |
|---|---|---|---|---|---|---|---|---|
| Subcarrier symbols to convey backchannel bit = 1 | ±3 ± 3j | ±3 ± 3j | ±3 ± 3j | ±3 ± 3j | ±1 ± 1j | ±1 ± 1j | ±1 ± 1j | ±1 ± 1j |
| Subcarrier symbols to convey backchannel bit = 0 | ±1 ± 1j | ±1 ± 1j | ±1 ± 1j | ±1 ± 1j | ±3 ± 3j | ±3 ± 3j | ±3 ± 3j | ±3 ± 3j |

Figure 11:
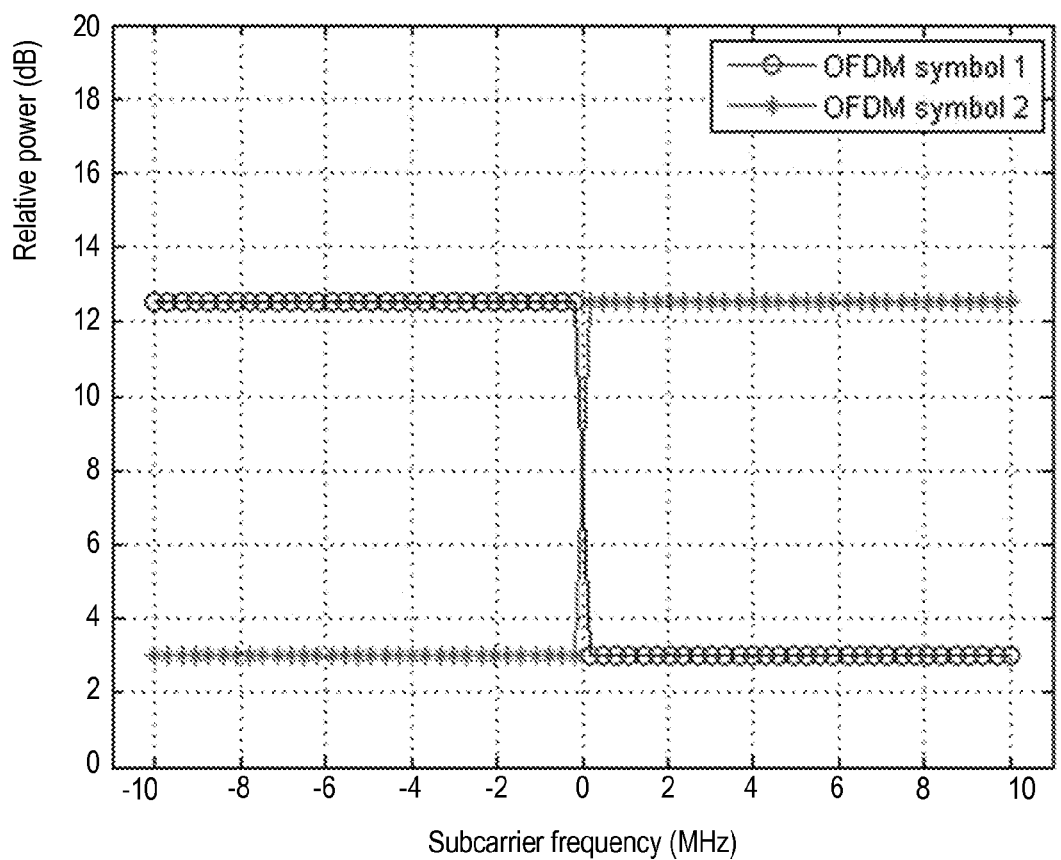
FIG. 11 is a graph depicting a frequency shift keying back-channel modulation scheme.

FIG. 11 show an example of binary FSK modulated back-channel signal in frequency domain. In the example shown, two bits are modulated in binary FSK back-channel by alloassignment for the subcarrier k reduces the size of $Q_k$ by the factor of ½. The size of $Q_k$ becomes 1 once all QAM mapping input bits for the subcarrier k are specified.

Figure 12:
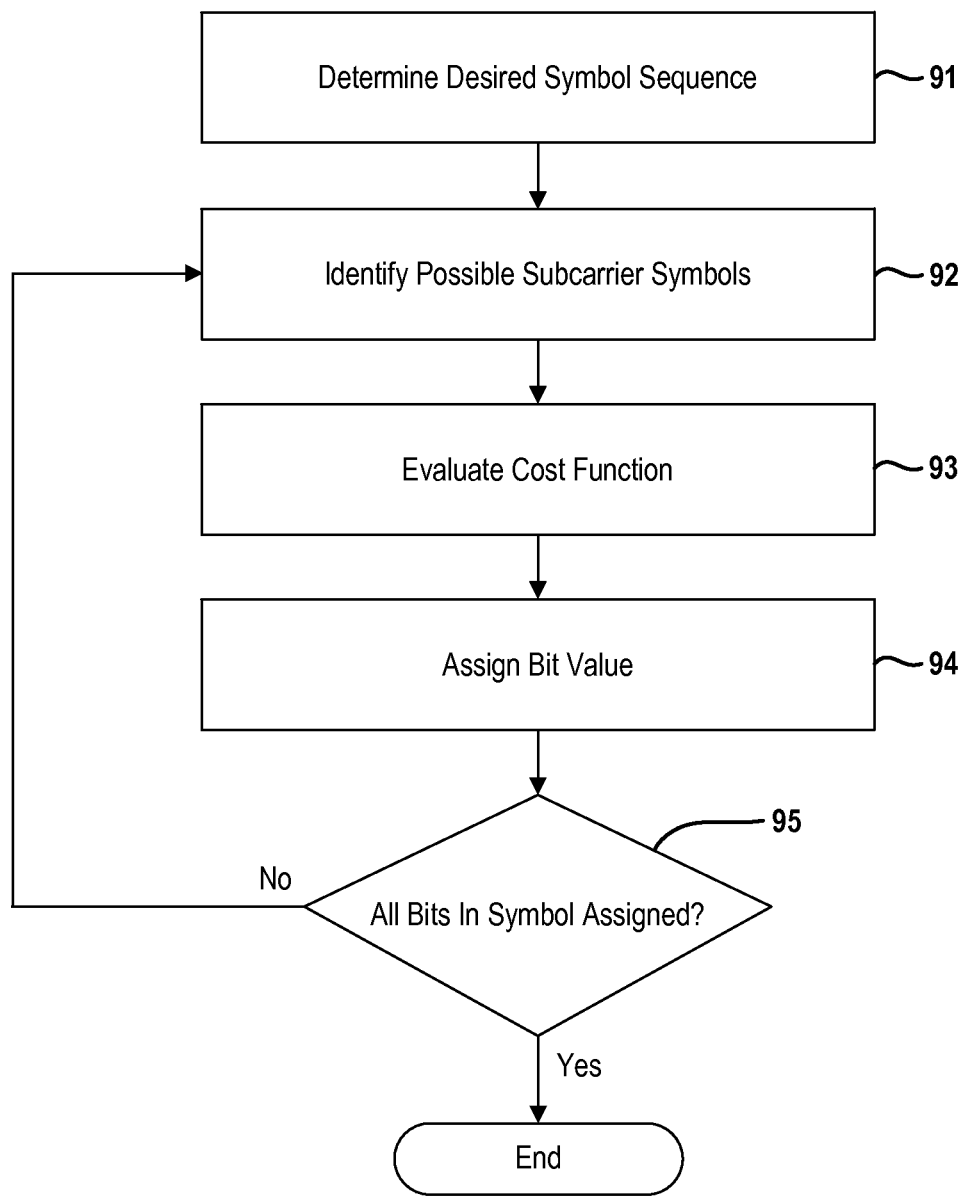
FIG. 12 is a flowchart depicting a method to identify a valid WiFi-compliant subcarrier symbol sequence which creates the desired frequency modulation in an OFDM symbol.

With reference to FIG. 12, the back-channel modulation is the process of determining $N_{SI}$ input bits, $b_0, \ldots, b_{N_{SI}-1}$, into the scrambler for each OFDM symbol. These bits are assigned sequentially as follows. First, the 'desired' sequence of QAM symbols is determined at 91 allocating high power symbols to subcarriers that belong to index set $I_H$, and allocating low power symbols to subcarriers that belong to index set $I_L$.

Next, construct the set of possible QAM symbols at 92 which can be assigned to the subcarrier k. Starting with subcarrier 1, $Q_k^{(1)}$ is the set of QAM symbols which can be assigned to subcarrier k when $b_j=1$ and $Q_k^{(0)}$ is the set of QAM symbols which can be assigned to subcarrier k when $b_j=0$, while $b_0, \ldots, b_{j-1}$ are already assigned to fixed values as the result of previous steps. Assuming a bit value of either 1 or 0, a cost (or penalty) function is evaluated at 93 for both values $b_j=1$ or 0. In an example, embodiment, the cost function is as follows:

$$C_b = \Sigma_{\forall k \in I_H}(P_{MAX} - \text{MAX}(|Q_k^{(b)}|^2)) + \Sigma_{\forall k \in I_L}(\text{MIN}(|Q_k^{(b)}|^2) - P_{MIN}),$$

where $P_{MAX}$ is the maximum QAM symbol power among the M-ary QAM symbols, $P_{MIN}$ is the minimum QAM symbol power, $|Q|^2$ is element-wise QAM symbol power computation on a set Q, and MAX(Q) (or MIN(Q)) is the operation to select the maximum (or minimum) in a set Q. If $C_0 > C_1$, $b_j$ is assigned with 0; otherwise, $b_j$ is assigned with 1. In this way, a value is assigned to $b_j$ of the input bit sequence. j is increased by 1 and the procedure is repeated from step 92 until $j=N_{SI}-1$, such that the back-channel modulation for an OFDM symbol is complete. That is, the steps are repeated from step 92 until all bits in the OFDM symbol are assigned as indicated at 95.

Figure 13:
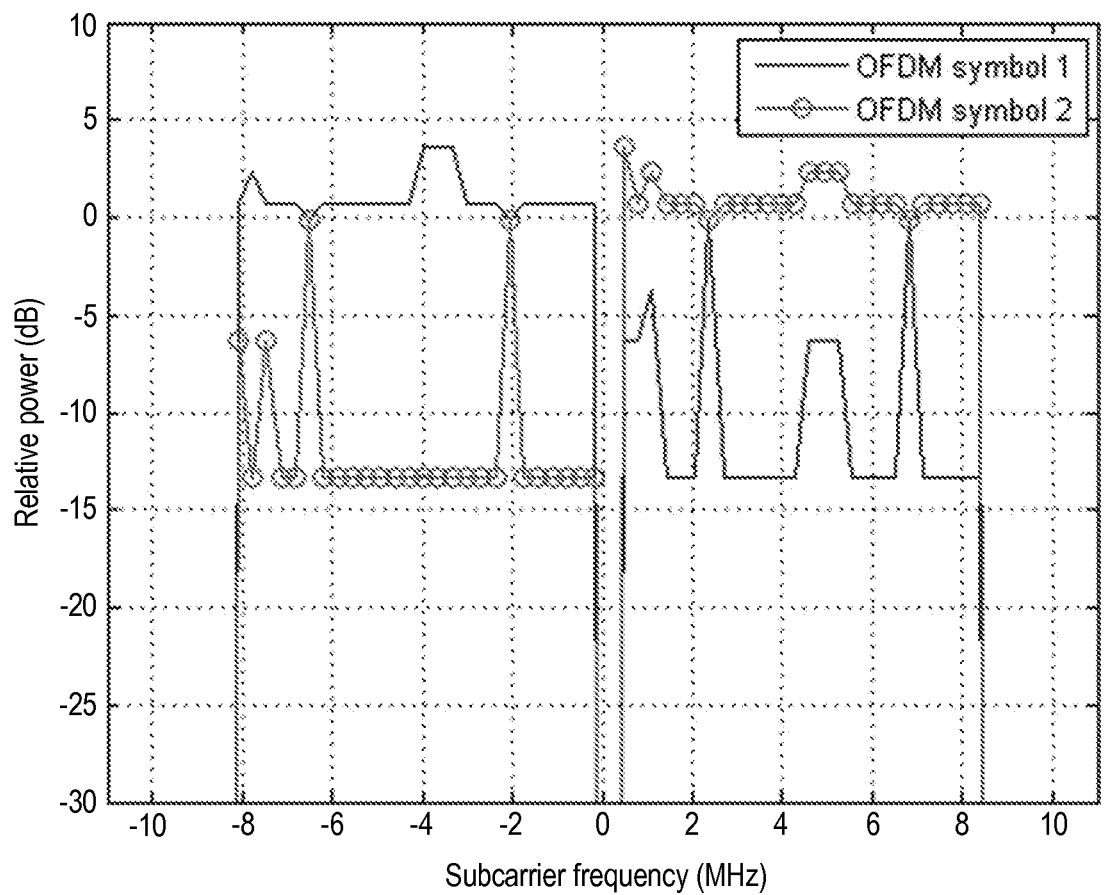
FIG. 13 is a graph depicting FSK modulated back-channel signal in the frequency domain complying with WiFi datapath.

FIG. 13 shows a result of the above procedure to create (approximated) binary FSK modulated back-channel. The non-flat power allocation in this figure is due to convolutional encoding and pilot/null subcarrier mapping required in WiFi datapath.

In some embodiments, it is feasible to realize an FSK OFDM back-channel receiver with dramatically reduced power consumption compared to a conventional OFDM receiver. The proposed receiver architecture is suitable for power-limited, non-WiFi compliant low power devices to demodulate FSK back-channel signals embedded in WiFi packets.

Figure 14A:
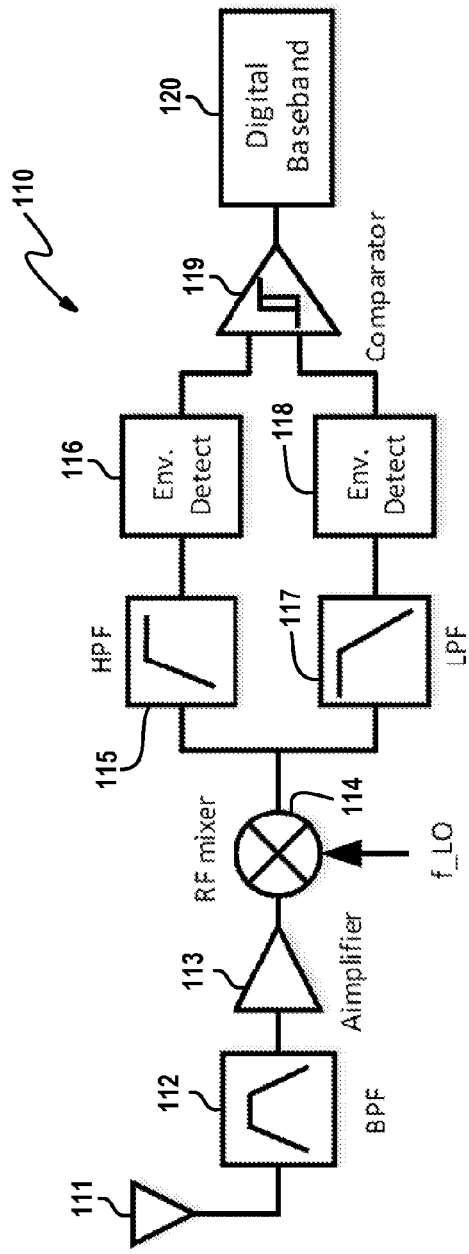
FIGS. 14A and 14B are block diagrams of example arrangements for back-channel receiver.

FIG. 14A depicts an example architecture for a low power receiver which can demodulate the FSK modulated back-channel. The receiver arrangement includes: an antenna 111, bandpass filter 112, an amplifier 113, an RF mixer 114, a high pass filter 115 in series with an envelope detector 116, a low pass filter 117 in series with a second envelope detector 118, a comparator 119 and a digital baseband processor 120. The non-coherent high/low-pass filters, envelope detectors, and a comparator function to detect power differences from high-/low-pass filter outputs. In operation, the received RF signal is optionally bandpass filtered and then mixed down to a low intermediate frequency (IF) by an RF mixer. The mixer output is high-/low-pass filtered, and envelope signals of high-/low-pass filter outputs are produced. The digital comparator produces the one-bit level comparison output comparing levels of two envelope detectors. The digital baseband processing produces the final demodulated bits.

Figure 14B:
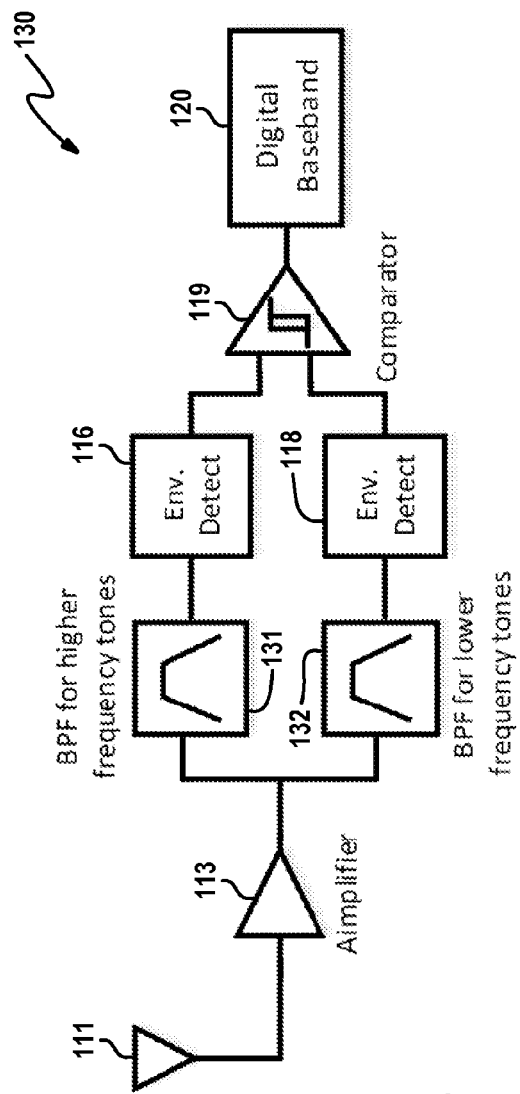

An alternative arrangement 130 for the receiver is shown in FIG. 14B. In this arrangement, the two RF band-pass filters 131, 132 with difference center frequencies are employed to detect the power difference in higher and lower frequency tones; otherwise, the remaining components are as described above in relation to FIG. 14A. Other arrangements for the back-channel receiver also fall within the broader aspects of this disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for encoding a message in a signal transmitted in accordance with an orthogonal frequency-division multiplexing (OFDM), comprising:
   identifying, by a transmitter, a subset of subcarrier symbols from which to create an OFDM symbol, where the subset of subcarrier symbols is selected from a finite symbol space for orthogonal frequency-division multiplexing and produces a signal that is demodulated by a receiver that does not comply with OFDM;
   receiving, by the transmitter, backchannel data to be transmitted in accordance with OFDM;
   encoding, by the transmitter, the backchannel data using the subset of subcarrier symbols; and
   transmitting, by the transmitter, the encoded backchannel data across a wireless network using orthogonal frequency-division multiplexing.

2. The method of claim 1 wherein encoding the data further comprises assigning a sequence of subcarrier symbols with a substantially constant phase rotation rate across subcarriers, thereby forming one or more pulses in time domain of the OFDM symbol.

3. The method of claim 2 wherein encoding the backchannel data further comprises adjusting the position of the one or more pulses within the OFDM symbol by selecting a particular phase rotation rate for the sequence of subcarrier symbols.

4. The method of claim 2 wherein encoding the backchannel data further comprises adjusting the phase of the one or more pulses in the OFDM symbol by selecting one of two or more starting subcarrier symbols having different phases.

5. The method of claim 2 wherein encoding the backchannel data further comprises adjusting the amplitude of the one or more pulses in the OFDM symbol by selecting one of two or more starting subcarrier symbols having different amplitudes.

6. The method of claim 2 wherein encoding the backchannel data further comprises adjusting pulse frequency in the OFDM symbol by using one or more phase rotation values for subcarrier symbol allocation.

7. The method of claim 1 wherein encoding the backchannel data further comprises assigning subcarrier symbols with varying amplitude across subcarriers, thereby modulating the frequency at which the energy of the OFDM symbol is concentrated.

8. The method of claim 1 wherein encoding the data further comprises assigning subcarrier symbol with varying amplitude across subcarriers as well as consecutive OFDM symbols, thereby modulation frequency chirp over consecutive OFDM symbols.

9. The method of claim 1 wherein the subcarrier symbols are defined in accordance with quadrature amplitude modulation (QAM).

10. The method of claim 2 wherein encoding the backchannel data further comprises:
- generating a desired sequence of subcarrier symbols which corresponds to the backchannel data, where the subcarrier symbols for the desired sequence of subcarrier symbols are selected from the subset of subcarrier symbols;
- converting the desired sequence of subcarrier symbols to an intermediate bit sequence using inverse operations of subcarrier mapping, interleaving, and puncturing; and
- assigning values to an input bit sequence which results in the intermediate bit sequence after undergoing scrambling and convolutional encoding.

11. The method of claim 7 wherein encoding the backchannel data further comprises:
- generating a desired sequence of subcarrier symbols which corresponds to the backchannel data, where the subcarrier symbols for the desired sequence of subcarrier symbols are selected from the subset of subcarrier symbols;
- for each subcarrier, determining select subcarrier symbols from the subset of subcarrier symbols that can be assigned to a given subcarrier;
- for each subcarrier, evaluating a cost function with a transmitter input bit value of zero and a transmitter input bit value of one, where the cost function is evaluated in part based on the select subcarrier symbols that can be assigned to the given subcarrier; and
- assigning values to an transmitter input bit sequence based on the evaluation of the cost function.

12. The method of claim 1 wherein transmitting the encoded backchannel data further comprises performing an Inverse Fourier transform operation on the encoded data.

13. The method of claim 1 wherein transmitting the encoded backchannel data further comprises modulating each subcarrier with one of quadrature amplitude modulation or phase-shift keying.

14. The method of claim 1 further comprises receiving, by a receiver, the encoded backchannel data transmitted by the transmitter; and decoding, by the receiver, the encoded backchannel data.

15. A method for encoding a message in a signal transmitted in accordance with an orthogonal frequency-division multiplexing (OFDM), comprising:
- receiving, by a transmitter, backchannel data to be transmitted in accordance with orthogonal frequency-division multiplexing;
- encoding, by the transmitter, the backchannel data by assigning quadrature amplitude modulation (QAM) symbols with a substantially constant phase rotation rate across subcarriers of an OFDM symbol, thereby forming one or more the one or more pulses in time domain of the OFDM symbol;
- transmitting, by the transmitter, the encoded backchannel data across a wireless network using orthogonal frequency-division multiplexing;
- receiving, by a receiver, the encoded backchannel data transmitted by the transmitter; and
- decoding, by the receiver, the encoded backchannel data, wherein the receiver does not operate in accordance with OFDM.

16. The method of claim 15 wherein encoding the backchannel data further comprises adjusting position of the one or more pulses within the OFDM symbol by selecting a particular phase rotation rate for the sequence of QAM symbols.

17. The method of claim 15 wherein encoding the backchannel data further comprises adjusting phase of the one or more pulses in the OFDM symbol by selecting one of two or more starting QAM symbols having different phases.

18. The method of claim 15 wherein encoding the backchannel data further comprises adjusting amplitude of the one or more pulses in the OFDM symbol by selecting one of two or more starting QAM symbols having different amplitudes.

19. A method for encoding a message in a signal transmitted in accordance with an orthogonal frequency-division multiplexing (OFDM), comprising:
- receiving, by a transmitter, backchannel data to be transmitted in accordance with orthogonal frequency-division multiplexing;
- encoding, by the transmitter, the backchannel data by assigning quadrature amplitude modulation (QAM) symbols with varying amplitude across subcarriers of an OFDM symbol, thereby modulating frequency of the OFDM symbol;
- transmitting, by the transmitter, the encoded backchannel data across a wireless network using orthogonal frequency-division multiplexing;
- receiving, by a receiver, the encoded backchannel data transmitted by the transmitter; and
- decoding, by the receiver, the encoded backchannel data, wherein the receiver does not operate in accordance with OFDM.

* * * * *